(12) United States Patent
Turner et al.

(10) Patent No.: US 8,086,765 B2
(45) Date of Patent: Dec. 27, 2011

(54) DIRECT I/O DEVICE ACCESS BY A VIRTUAL MACHINE WITH MEMORY MANAGED USING MEMORY DISAGGREGATION

(75) Inventors: Yoshio Turner, San Francisco, CA (US); Jose Renato Santos, San Jose, CA (US); Jichuan Chang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 12/769,897

(22) Filed: Apr. 29, 2010

(65) Prior Publication Data

US 2011/0271014 A1    Nov. 3, 2011

(51) Int. Cl.
*G06F 3/00* (2006.01)
*G06F 13/28* (2006.01)
*G06F 5/00* (2006.01)
*G06F 13/12* (2006.01)
*G06F 13/38* (2006.01)
*G06F 13/36* (2006.01)

(52) U.S. Cl. ............ 710/22; 710/1; 710/2; 710/3; 710/4; 710/5; 710/6; 710/7; 710/8; 710/9; 710/10; 710/11; 710/12; 710/13; 710/14; 710/15; 710/16; 710/17; 710/18; 710/19; 710/20; 710/21; 710/23; 710/36; 710/56; 710/58; 710/65; 710/308

(58) Field of Classification Search ................. 710/1–22
See application file for complete search history.

(56) References Cited

U.S. PATENT DOCUMENTS

| | | | |
|---|---|---|---|
| 7,996,569 B2 * | 8/2011 | Aloni et al. | 709/250 |
| 2005/0246453 A1 * | 11/2005 | Erlingsson et al. | 710/1 |
| 2007/0162572 A1 * | 7/2007 | Aloni et al. | 709/219 |
| 2007/0162619 A1 * | 7/2007 | Aloni et al. | 709/250 |
| 2007/0244972 A1 * | 10/2007 | Fan | 709/205 |
| 2008/0133709 A1 * | 6/2008 | Aloni et al. | 709/218 |

* cited by examiner

*Primary Examiner* — Chun-Kuan Lee
*Assistant Examiner* — Getente A Yimer
(74) *Attorney, Agent, or Firm* — Theodore C. McCullough

(57) ABSTRACT

Illustrated is a system and method for identifying a memory page that is accessible via a common physical address, the common physical address simultaneously accessed by a hypervisor remapping the physical address to a machine address, and the physical address used as part of a DMA operation generated by an I/O device that is programmed by a VM. It also includes transmitting data associated with the memory page as part of a memory disaggregation regime, the memory disaggregation regime to include an allocation of an additional memory page, on a remote memory device, to which the data will be written. It further includes updating a P2M translation table associated with the hypervisor, and an IOMMU translation table associated with the I/O device, to reflect a mapping from the physical address to a machine address associated with the remote memory device and used to identify the additional memory page.

20 Claims, 13 Drawing Sheets

701 IDENTIFYING A MEMORY PAGE THAT IS ACCESSIBLE VIA A COMMON PHYSICAL ADDRESS, THE COMMON PHYSICAL ADDRESS SIMULTANEOUSLY ACCESSED BY A HYPERVISOR REMAPPING THE PHYSICAL ADDRESS TO A MACHINE ADDRESS, AND THE PHYSICAL ADDRESS USED AS PART OF A DMA OPERATION GENERATED BY AN I/O DEVICE THAT IS PROGRAMMED BY A VM

702 TRANSMIT DATA ASSOCIATED WITH THE MEMORY PAGE AS PART OF A MEMORY DISAGGREGATION REGIME, THE MEMORY DISAGGREGATION REGIME TO INCLUDE AN ALLOCATION OF AN ADDITIONAL MEMORY PAGE, ON A REMOTE MEMORY DEVICE, TO WHICH THE DATA WILL BE WRITTEN

703 UPDATE A P2M TRANSLATION TABLE ASSOCIATED WITH THE HYPERVISOR, AND AN IOMMU TRANSLATION TABLE ASSOCIATED WITH THE I/O DEVICE, TO REFLECT A MAPPING FROM THE PHYSICAL ADDRESS TO A MACHINE ADDRESS ASSOCIATED WITH THE REMOTE MEMORY DEVICE AND USED TO IDENTIFY THE ADDITIONAL MEMORY PAGE

704 ISSUE A PREPARE COMMAND TO THE REMOTE MEMORY DEVICE, THE PREPARE COMMAND TO CAUSE THE DMA OPERATION FOR THE ADDITIONAL MEMORY PAGE TO BE QUEUED

705 ISSUE A TRANSFER AND UPDATE COMMAND TO INITIATE THE TRANSMISSION OF DATA TO THE ADDITIONAL MEMORY PAGE, THE TRANSFER AND UPDATE COMMAND TO CAUSE THE REMOTE MEMORY DEVICE TO TRANSMIT THE DATA AND TO APPLY THE QUEUED DMA OPERATION TO THE DATA

706 ISSUE COMMANDS TO THE I/O DEVICE THAT RELATE TO THE DMA OPERATION, THE COMMANDS ISSUED DIRECTLY TO THE I/O DEVICE BY THE VM WITHOUT MEDIATION BY THE HYPERVISOR

707 EVICT THE MEMORY PAGE WHERE AN EVENT TAKES PLACE DURING THE GENERATION OF THE DMA OPERATION

FIG. 8 

```
┌─────────────────────────────────────────────────────────────┐
│ IDENTIFY A MEMORY PAGE, ASSOCIATED WITH A MEMORY BLADE,     │
│  THAT IS ACCESSIBLE VIA A COMMON PHYSICAL ADDRESS, THE      │
│  COMMON PHYSICAL ADDRESS SIMULTANEOUSLY ACCESSED BY A       │
│  HYPERVISOR REMAPPING THE PHYSICAL ADDRESS TO A MACHINE     │
│  ADDRESS, AND THE PHYSICAL ADDRESS USED AS PART OF A DMA    │
│   OPERATION ISSUED BY AN I/O DEVICE THAT IS PROGRAMMED BY A │
│                              VM                             │
└─────────────────────────────────────────────────────────────┘
                              ↓ 801
┌─────────────────────────────────────────────────────────────┐
│   INITIATE A TRANSFER OF DATA ASSOCIATED WITH THE MEMORY    │
│  PAGE, THE DATA TRANSFERRED TO AN ADDITIONAL MEMORY PAGE,   │
│  ASSOCIATED WITH A HOST DEVICE, AND THAT IS IDENTIFIED BY AN│
│                   ADDITIONAL MACHINE ADDRESS                │
└─────────────────────────────────────────────────────────────┘
                              ↓ 802
┌─────────────────────────────────────────────────────────────┐
│     UPDATE A P2M TRANSLATION TABLE ASSOCIATED WITH THE      │
│    HYPERVISOR, AND AN IOMMU TRANSLATION TABLE ASSOCIATED    │
│   WITH THE I/O DEVICE, TO REFLECT THE REMAPPING FROM THE    │
│      PHYSICAL ADDRESS TO THE ADDITIONAL MACHINE ADDRESS     │
└─────────────────────────────────────────────────────────────┘
                              ↓ 803
┌─────────────────────────────────────────────────────────────┐
│     ISSUE A PREPARE COMMAND TO THE MEMORY BLADE, THE        │
│   PREPARE COMMAND TO CAUSE THE DMA OPERATION FOR THE        │
│              MEMORY PAGE TO BE QUEUED                       │
└─────────────────────────────────────────────────────────────┘
                              ↓ 804
┌─────────────────────────────────────────────────────────────┐
│      DE-QUEUE THE DMA OPERATION AND APPLYING THE DMA        │
│    OPERATION TO THE DATA TRANSFERRED TO THE ADDITIONAL      │
│                        MEMORY PAGE                          │
└─────────────────────────────────────────────────────────────┘
                              ↓ 805
┌─────────────────────────────────────────────────────────────┐
│  ISSUE A TRANSFER AND UPDATE COMMAND TO INITIATE THE        │
│ TRANSFER OF THE DATA, AND THE UPDATE OF THE DATA USING AT   │
│              LEAST ONE DMA OPERATION                        │
└─────────────────────────────────────────────────────────────┘
                      ↓ 806            807
┌─────────────────────────────────────────────────────────────┐
│ ISSUE A COMPLETE COMMAND TO THE MEMORY BLADE INDICATING     │
│  TO THE MEMORY BLADE THAT THE MEMORY BLADE SHOULD EXIT A    │
│                       PREPARE MODE                          │
└─────────────────────────────────────────────────────────────┘
```

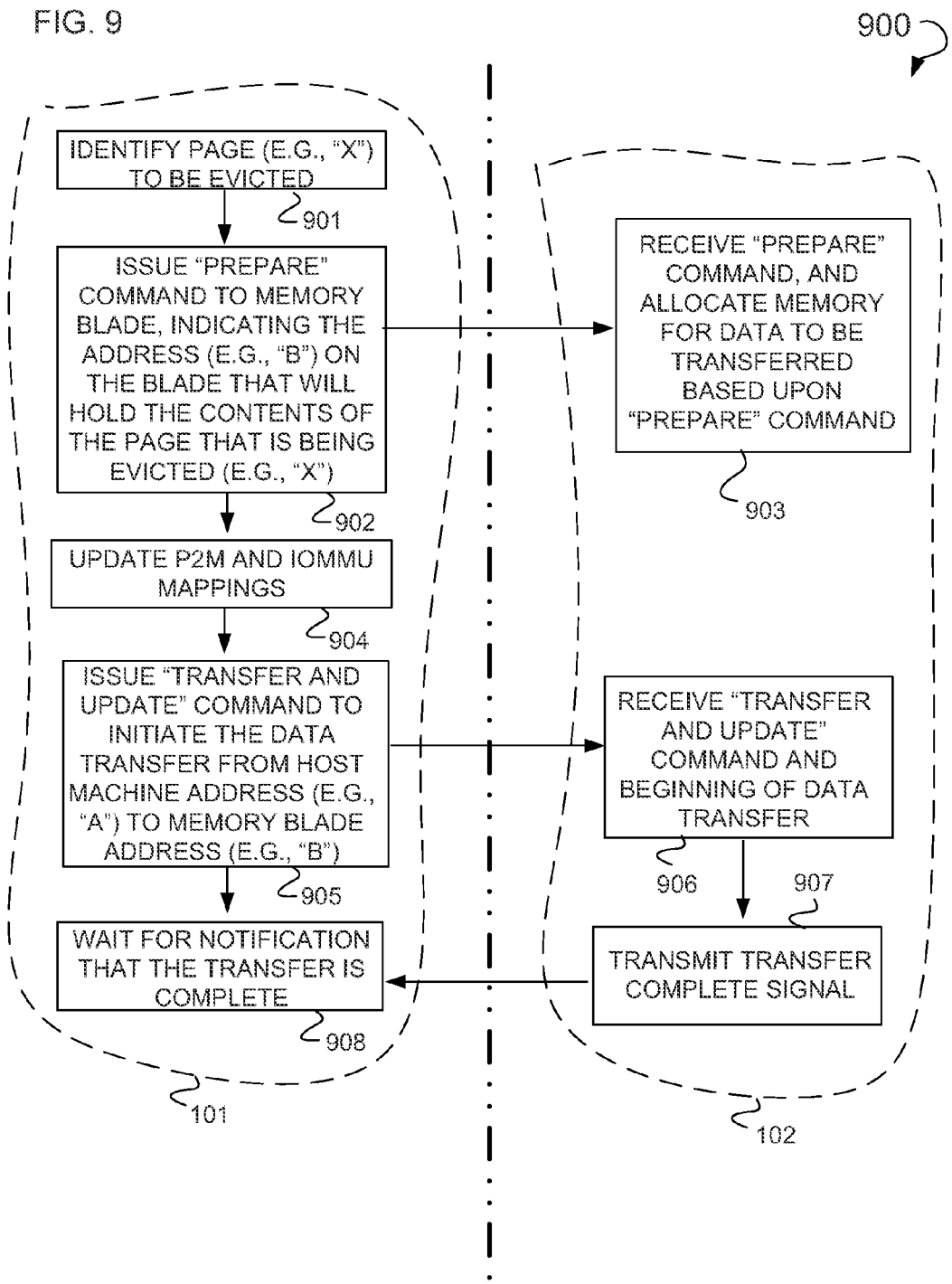

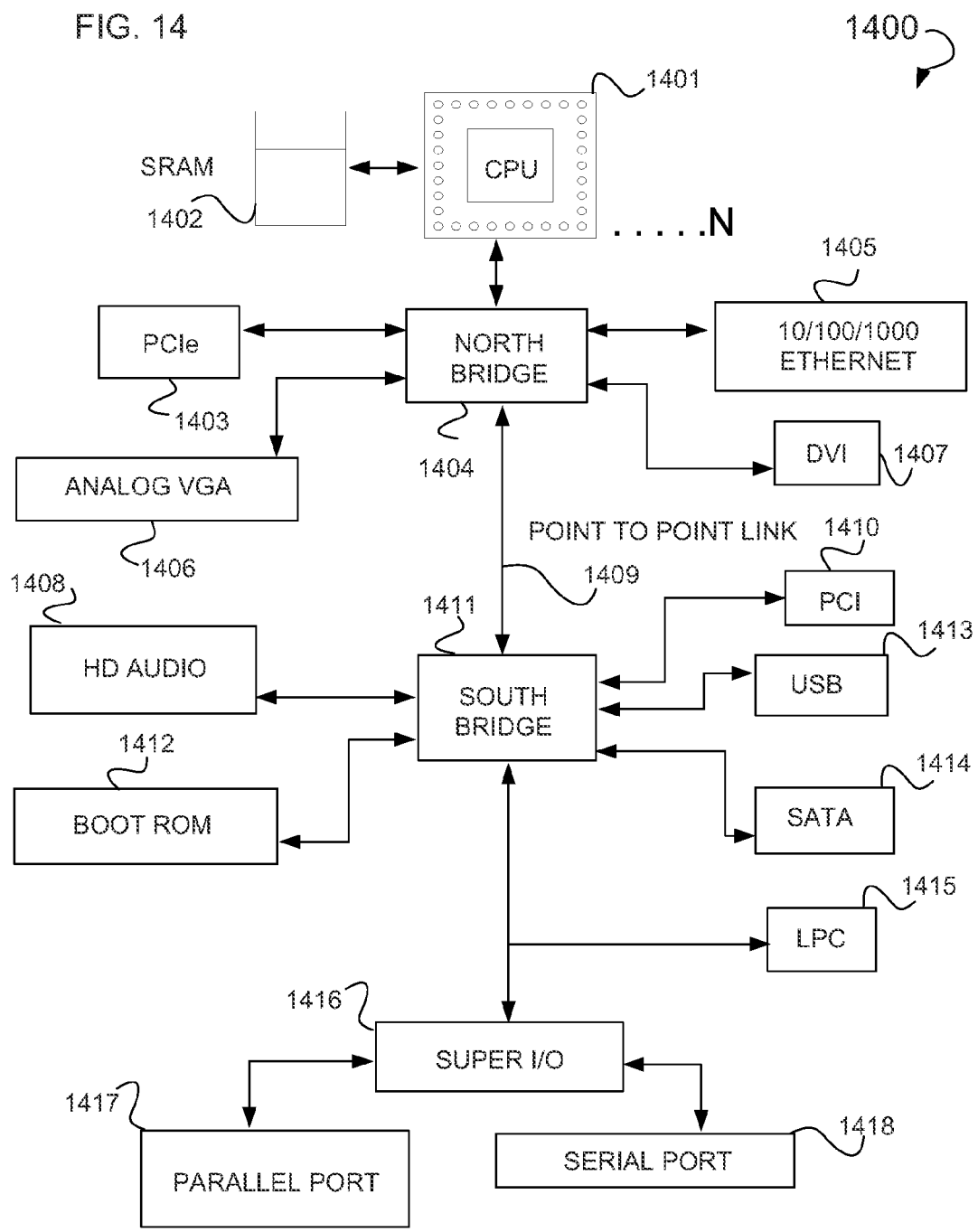

US 8,086,765 B2

DIRECT I/O DEVICE ACCESS BY A VIRTUAL MACHINE WITH MEMORY MANAGED USING MEMORY DISAGGREGATION

BACKGROUND

Memory disaggregation is a technique which logically extends the local memory attached to a host Central Processing Unit (CPU) with additional memory provided on special memory devices (e.g. a memory blade or Solid State Drive (SSD)) connected via an Input/Output (I/O) interconnect (e.g. Peripheral Component Interconnect Express (PCIe)). Further, memory disaggregation may be implemented in connection with a virtualized computing environments that include a plurality of Virtual Machines (VMs) managed by a hypervisor. Example VMs include the LINUX™ or WINDOWS™ operating system, whereas example hypervisors include the XEN™ or FUSION™ hypervisor.

BRIEF DESCRIPTION OF THE DRAWINGS

Some embodiments of the invention are described, by way of example, with respect to the following figures:

FIG. 7 is a flow chart illustrating a method, according to an example embodiment, executed to resolve a simultaneous access of a local memory page by a hypervisor and an I/O device that is programmed by a VM.

FIG. 8 is a flow chart illustrating a method, according to an example embodiment, used to resolve a page fault that arises where a VM attempts to directly access an I/O device and the memory page is located remotely from the compute blade.

FIG. 9 is a dual-stream flow chart illustrating a method, according to an example embodiment, that uses specific memory blade commands implemented as part of a memory disaggregation regime, where a page fault occurs during the direct access of an I/O device by a VM.

FIG. 14 is a diagram of an example computer system.

DETAILED DESCRIPTION

Figure 1:
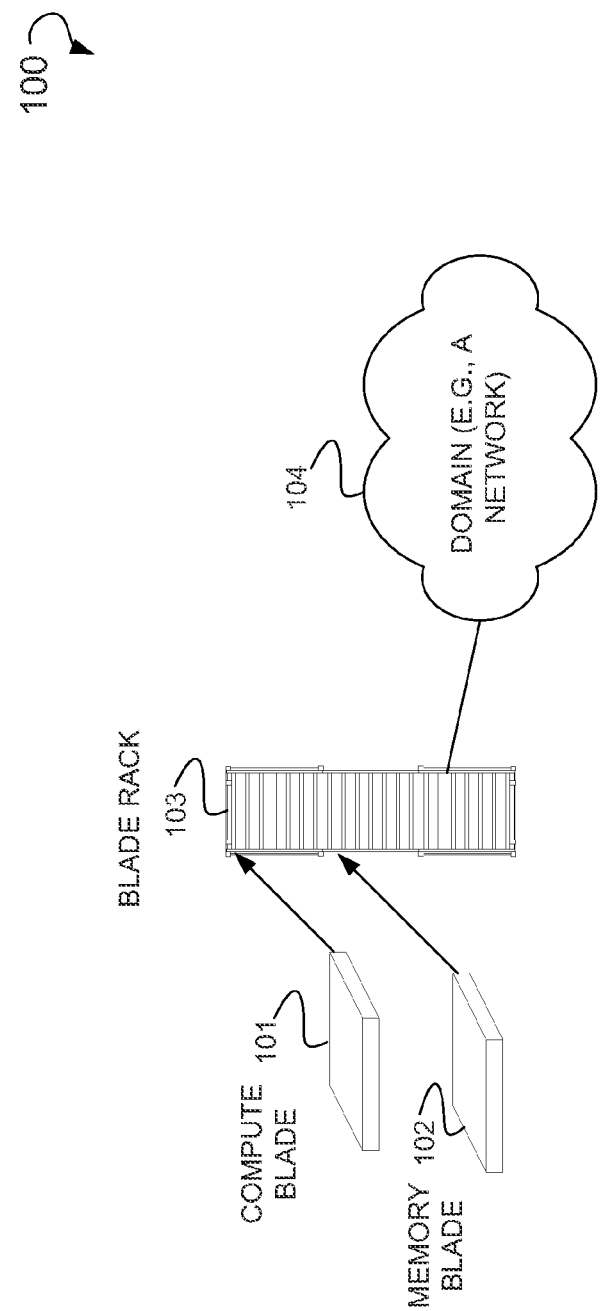
FIG. 1 is a diagram of a system, according to an example embodiment, illustrating the use of memory disaggregation to allow for a VM to directly access an I/O device.

Illustrated is a system and method for direct I/O for VMs on a computer system that uses hypervisor-mediated memory disaggregation. Applying the system and method illustrated herein a VM can bypass the hypervisor, and, for example, program Network Interface Cards (NICs) or other I/O devices without any awareness of the use of memory disaggregation. In particular, I/O operations initiated by the VM are unaffected by the concurrent actions by the hypervisor that dynamically change the mapping of VM physical memory (e.g., to host local memory or to remote memory on a memory blade). In order to understand how the VMs are unaffected by the concurrent actions by the hypervisor that dynamically change the mapping of VM physical memory, it is important to explain the various memory mappings that exist as part of a virtualized computing environment.

In some example embodiments, a virtualized computing environment includes two different types of addressing: Physical Addressing (PA) and Machine Addressing (MA). PA, as used herein, is a memory cell address that is accessible and viewable by a VM. A MA, as used herein, is a memory cell address that corresponds to a particular memory cell on a particular machine. In a virtualized computing environment, address translation is implemented whereby the PA is translated into a MA such that a VM views the PA as associated with only one physical machine and is oblivious to the existence of an MA. By contrast, while the hypervisor views the PA as associated with an MA, the hypervisor is also able to see the MA as being associated with one of a plurality of machines (e.g., a compute blade).

In some example embodiments, a virtualized computing environment is implemented whereby the hypervisor maintains a translation table for PA→MA mappings, reference herein as a P2M table. Further, as part of this virtualized computing environment, an I/O Memory Management Unit translation table (IOMMU table) is implemented to manage PA→MA mappings utilized by an I/O device within the virtualized computing environment.

For the purposes of illustration only, in an example embodiment, an event in the form of a page fault occurs when a VM attempts to access a physical address that maps to a memory page on the remote memory device (i.e., the corresponding PA→MA mapping is marked "not present"). The hypervisor handles this page fault by transferring the contents of the memory page from the remote memory device to a free page on the host, remapping the physical address to the new location on the host, and marking the mapping entry as "present". To carry out this page fault handling procedure, the hypervisor may first need to free a memory page on the host. To do so, the hypervisor chooses a "victim" page on the host to evict to the remote memory device. The eviction involves the hypervisor changing the PA→MA mapping for the victim page, marking the entry "not present", changing the IOMMU mapping for victim page, and transferring the contents of the victim page to the remote memory device. Suppose that the victim page is also being used for writing by an I/O device at the time the page is chosen for eviction. In this case, during the multi-step eviction procedure carried out by the hypervisor to handle the page fault event, the I/O device can concurrently (simultaneously) attempt to modify the victim page using a DMA write operation. Depending on precisely when the DMA write operation occurs during the eviction process, the data update specified by the DMA write operation may be lost, either because the DMA operation writes to the host page after the hypervisor has transferred the contents of the victim page to the remote memory device, or because the DMA operation writes to the remote memory blade page before the hypervisor has transferred the contents of the victim page to the remote memory device. In order to resolve this type of concurrency problem which leads to incorrect memory contents, the system and method illustrated herein extends the mechanism and process used for memory disaggregation. A page fault is only one example of an event that may require the hypervisor to utilize memory disaggregation. Additional types of events include a scheduling event (i.e., a VM pre-emption, sleep, and wakeup), or a device interrupt (i.e., a timer).

FIG. 1 is a diagram of an example system 100 illustrating the use of memory disaggregation to allow for a VM to directly access an I/O device. Shown are a compute blade 101, and a memory blade 102 each of which is positioned proximate to a blade rack 103. The compute blade 101 and memory blade 102 are operatively connected to the domain 104 via a logical or physical connection. The domain 104 may be an internet, an intranet, a Wide Area Network (WAN), a Local Area Network (LAN), an I/O interconnect network such as PCI Express, or some other network and suitable topology associated with the network.

Figure 2:
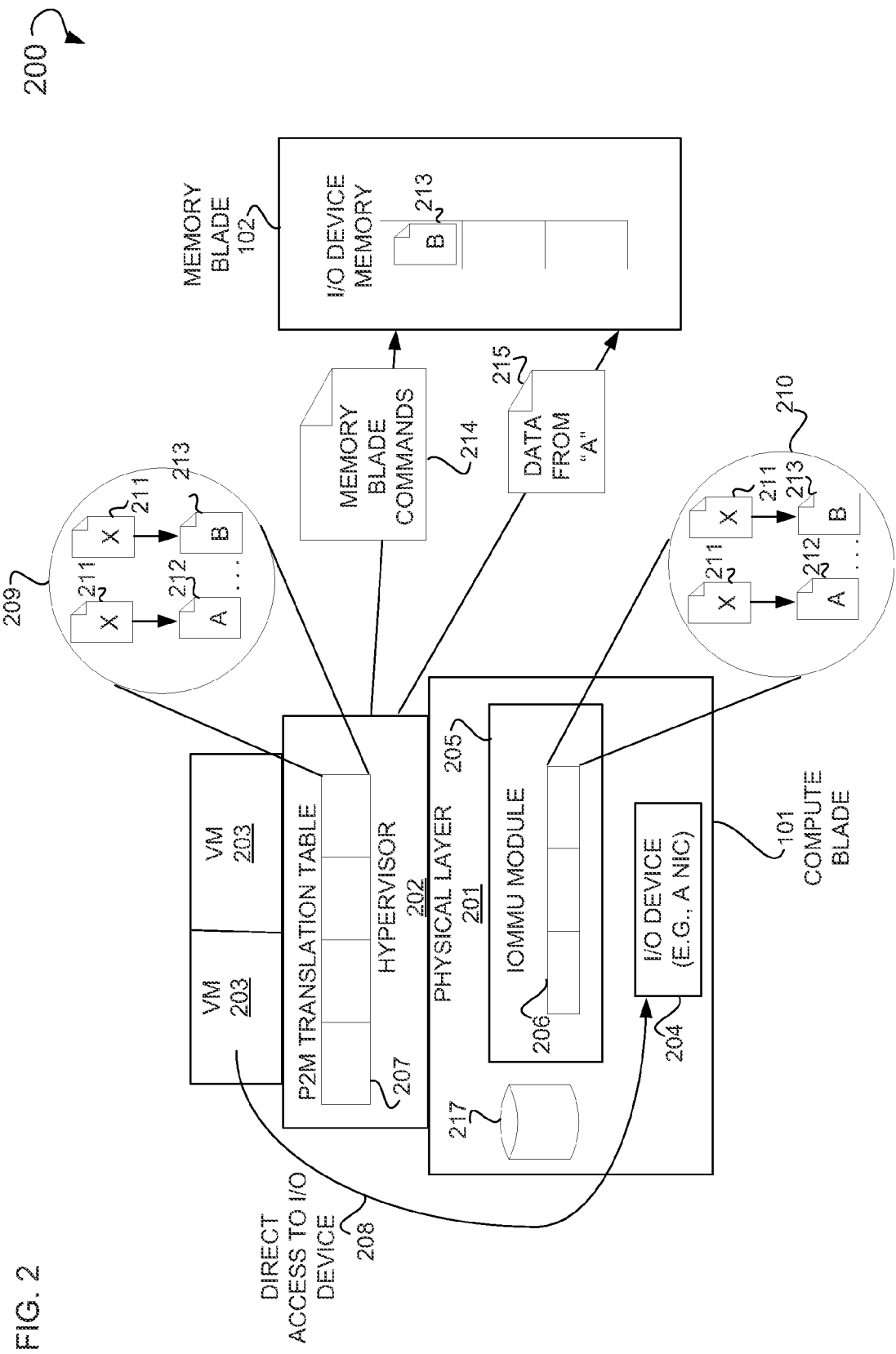
FIG. 2 is a diagram of a system, according to an example embodiment, illustrating the use of memory disaggregation where a page fault occurs during the direct access of an I/O device by a VM.

FIG. 2 is a diagram of an example system 200 illustrating the use of memory disaggregation where a page fault occurs during the direct access of an I/O device by a VM. Shown is the compute blade 101 and memory blade 102. Residing on the compute blade 101 is a physical layer 201. Included in the physical layer 201 is an I/O device 204, and local memory 217. This I/O device 204 may be a NIC, Universal Serial Bus (USB) port, a Serial Advanced Technology Attachment (SATA) device, or other suitable I/O device. Also included in the physical layer 201 is a IOMMU module 205 that includes an IOMMU table 206 for each I/O device that contains mappings between the PA→MA corresponding to the VM that directly accesses that I/O device. These mappings are shown in exploded view 210, where PA 211 is mapped to MA 212. Residing on the physical layer 201 is a hypervisor 202 that includes a P2M translation table 207. The address mappings in this P2M translation table 207 are shown in an exploded view 209 illustrating the mapping between the PA 211 and the MA 212, and the remapping from PA 211 to the MA 213 where a page fault occurs. Residing on the hypervisor 202 is at least one VM in the form of a VM 203. One or more of these VMs 203 may be used to directly access the I/O device 204. Also shown is the memory blade 103. Residing as part of this memory blade 103 is a collection of memory pages that includes the MA 213.

In some example cases, a page fault occurs when the VM 203 is directly accessing the I/O device 204 (see generally 208 illustrating the direct access of the I/O device 204 by the VM 203). As used herein, and as illustrated at 208, the direct access of the I/O device 204 by the VM 203 occurs without mediation by the hypervisor 202. This page fault may occur where the VM 203 attempts to access a page that is marked or flagged as "not present" in the P2M translation table 207. The memory page may not be present because the hypervisor 202 has selected the memory page as a victim page whose contents are to be evicted (i.e., moved) to the memory blade 102. This page fault may expose a concurrency problem of the I/O device 204 attempting to access the page and the hypervisor 202 changing the address mapping and transferring the page contents to or from the memory blade.

To resolve this page fault, a memory disaggregation regime may be implemented such that the PA 211 that exists within the P2M translation table 207 and the IOMMU table 206 is remapped to the MA 213 that resides on the memory blade 102. As will be discussed in more detail below, in cases where a remapping occurs, the data formerly included in the memory page addressed by the MA 212 is written to the MA 213. This writing of data is referenced at 215. The implementation of this disaggregation regime by the hypervisor 202 is invisible to the I/O device 204 and the VM 203 utilizing the I/O device 204.

In some example embodiments, the disaggregation regime includes the transmission of commands to the memory blade 102. These commands, represented as memory blade commands 214, include that the following:

1) "Prepare" command which causes the memory blade to queue Peripheral Component Interconnect (PCI) memory read/write requests for a particular memory page instead of processing the requests;
2) "Complete" command that causes the memory blade 102 to stop queuing requests for a particular page;
3) "Transfer and update" command that causes the memory blade 102 to apply the queued operations for a page on the memory blade 102 and transferring the updated contents of the page to a memory page on the host (e.g., the compute blade 101);
4) "Cancel Transfer" command which cancels an incomplete page remapping procedure from host memory to remote memory; and
5) "Report" command that returns the number of currently enqueued operations for a page on the memory blade 102.

The "prepare" command may be bundled with "transfer and update" command as one single message. The order and actual implementation details associated with each command will be illustrated in more detail below.

Figure 3:
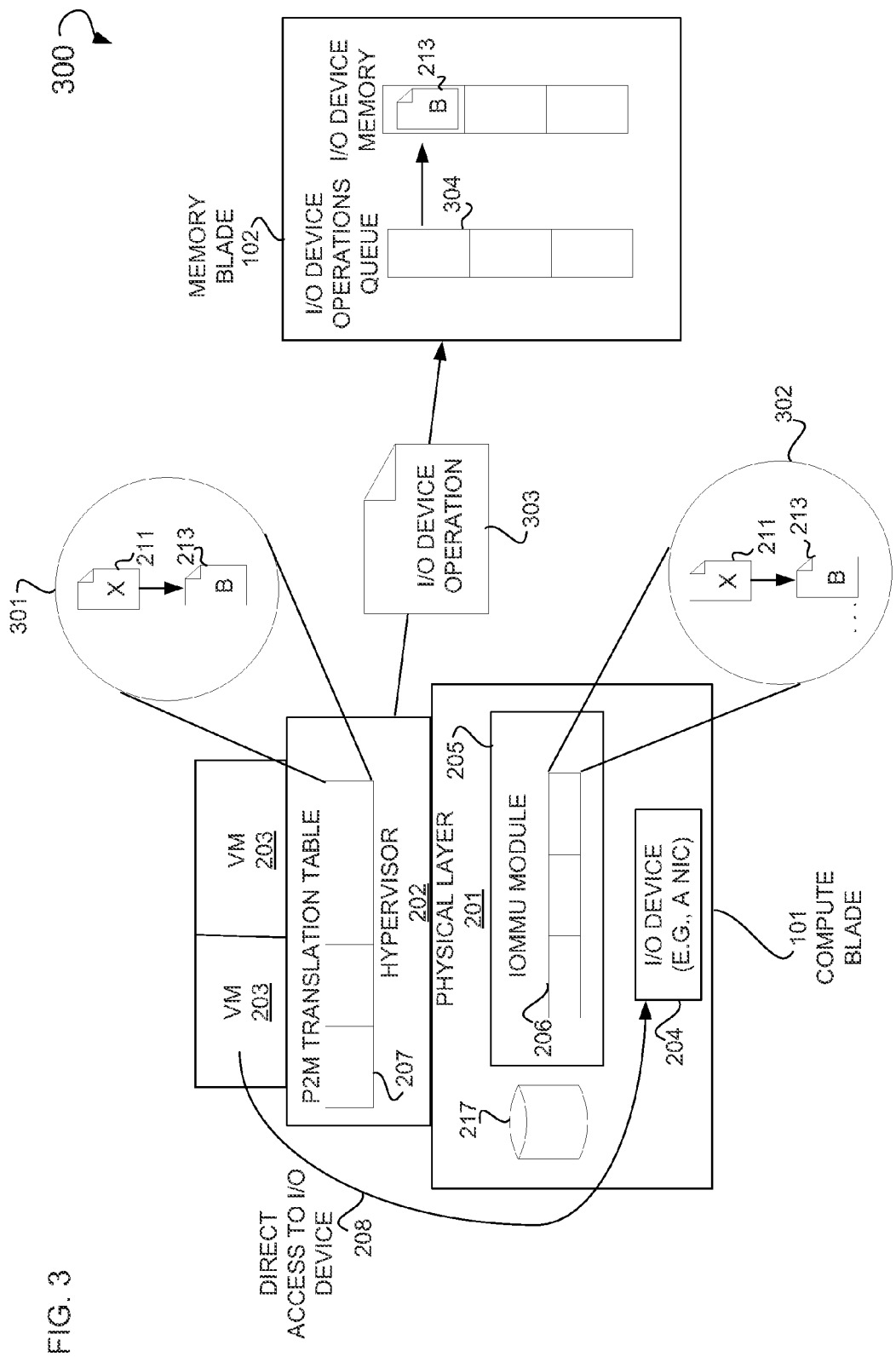
FIG. 3 is a diagram of a system, according to an example embodiment, illustrating the queuing of I/O device commands during the execution of the memory disaggregation regime.

FIG. 3 is a diagram of an example system 300 illustrating the queuing of I/O device commands during the execution of the memory disaggregation regime. Shown is an exploded view 301 illustrating the mapping of the PA 211 to the MA 213 as it exists within the P2M translation table 207. Further shown is an exploded view 302 illustrating the mapping of the PA 211 to the MA 213 as it exists within the IOMMU table 206. Both exploded views 301 and 302 illustrate the PA→MA mapping after a page fault has occurred. Further shown is a I/O device operation 303 that queued into an I/O device operation's queue 304 that resides as part of the memory blade 102. This I/O device operation 303 is queued into the I/O device operations queue 304 in cases where the remapping between the PA and MA has occurred, but the data residing as part of the memory page referenced by the MA (e.g., MA 212) has not been completely transmitted to the I/O device memory 213. The I/O device operation 303 may include Direct Memory Access (DMA) operations. Once transmission is complete, the I/O device operation 303 is de-queued from the I/O device operations queue 304 and executed by the memory blade 102.

Figure 4:
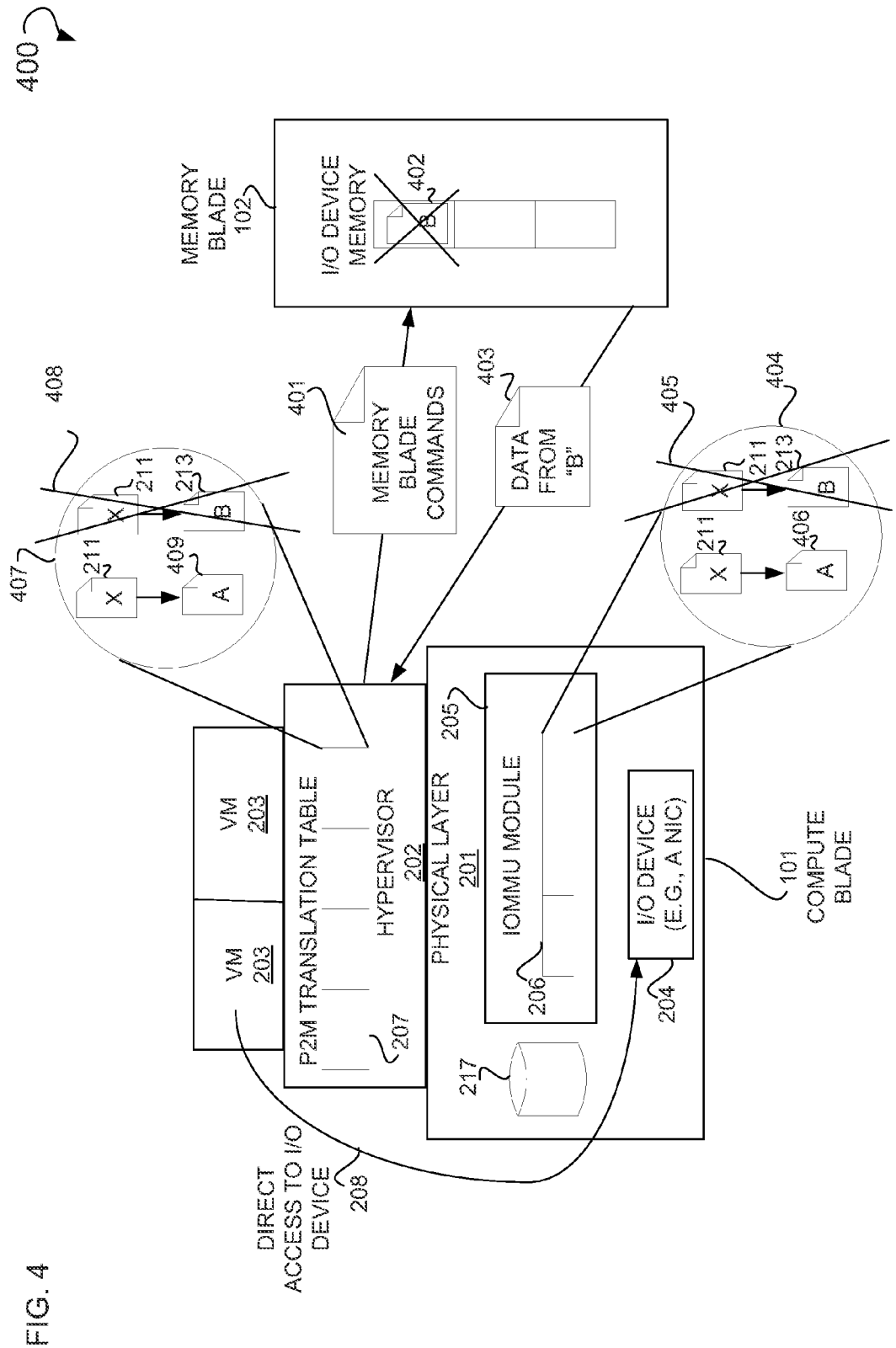
FIG. 4 is a diagram of a system, according to an example embodiment, illustrating the use of memory disaggregation where a page fault occurs during the direct access of an I/O device by a VM.

FIG. 4 is a diagram of an example system 400 illustrating the use of memory disaggregation where a page fault occurs during the direct access of an I/O device by a VM. Shown is an exploded view 407 of the P2M translation table 207 illustrating a page fault 408 that occurs when the PA 211 attempts to access the MA 213. This same page fault is reflected at 405 in exploded view 404 representing the PA 211 to MA 213 mapping of the IOMMU table 206. The page fault may occur where the VM 203 attempts to access the memory page associated with the MA 213, but this page has not been loaded into local memory 217. To resolve this page fault, a memory command 401 is transmitted to the memory blade 102 by the compute blade 101 to write the data of the remotely located memory page to a local memory 217. The writing of the data of the remotely located memory page is referenced at 403 and 402. As with the previously illustrated page fault of FIG. 2, the implementation of this disaggregation regime by the hypervisor 202 is invisible to the I/O device 204 and the VM 203 utilizing the I/O device 204.

Figure 5:
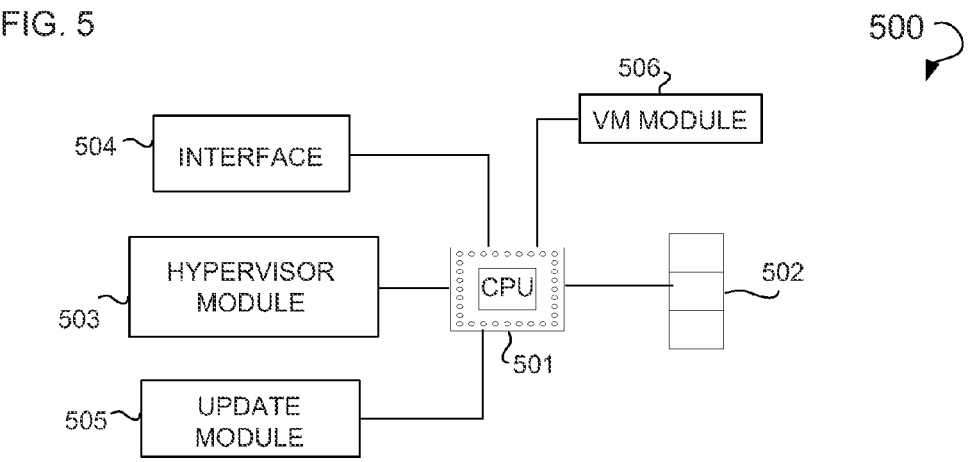
FIG. 5 is a block diagram of a system, according to an example embodiment, used to resolve a simultaneous access of a local memory page by a hypervisor and an I/O device that is programmed by a VM.

FIG. 5 is a block diagram of an example system 500 used to resolve a simultaneous access of a local memory page by a hypervisor and a I/O device that is programmed by a VM. An example of the system 500 is the blade rack 103 that includes the compute blade 101 and memory blade 102. These various blocks may be implemented in hardware, firmware, or software. Further, these various blocks are operatively connected via a logical or physical connection. Shown is a Central Processing Unit (CPU) 501 operatively connected to a memory 502. Operatively coupled to the CPU 501 is a hypervisor module 503 to identify a memory page that is accessible via a common physical address, the common physical address simultaneously accessed by a hypervisor to remap the physical address to a machine address, and the physical address used as part of a DMA operation generated by an I/O device that is programmed by a VM. Operatively coupled to the CPU 501 is an interface 504 to transmit data associated with the memory page as part of a memory disaggregation regime, the memory disaggregation regime to include an allocation of an additional memory page, on a remote memory device, to which the data will be written. Operatively coupled to the CPU 501 is an update module 505 to update a P2M translation table associated with the hypervisor, and an IOMMU translation table associated with the I/O device, to reflect a mapping from the physical address to a machine address associated with the remote memory device and used to identify the additional memory page. In some example embodiments, the interface 504 issues a prepare command to the remote memory device, the prepare command to cause the DMA operation for the additional memory page to be queued. In some example embodiments, the remote memory device includes at least one of a memory blade or SSD. In some example embodiments, the interface 504 issues a transfer and update command to initiate the transmission of data to the additional memory page, the transfer and update command to cause the remote memory device to transmit the data and to apply the queued DMA operation to the data. Operatively connected to the CPU 501 is a VM module 506 that may issue commands to the I/O device that relate to the DMA operation, the commands issued directly to the I/O device by the VM without mediation by the hypervisor. Further, the hypervisor may evict the memory page where an event takes place during the generation of the DMA operation. Moreover, the hypervisor may use a PCIe transport medium to transmit instructions to the remote memory device.

Figure 6:
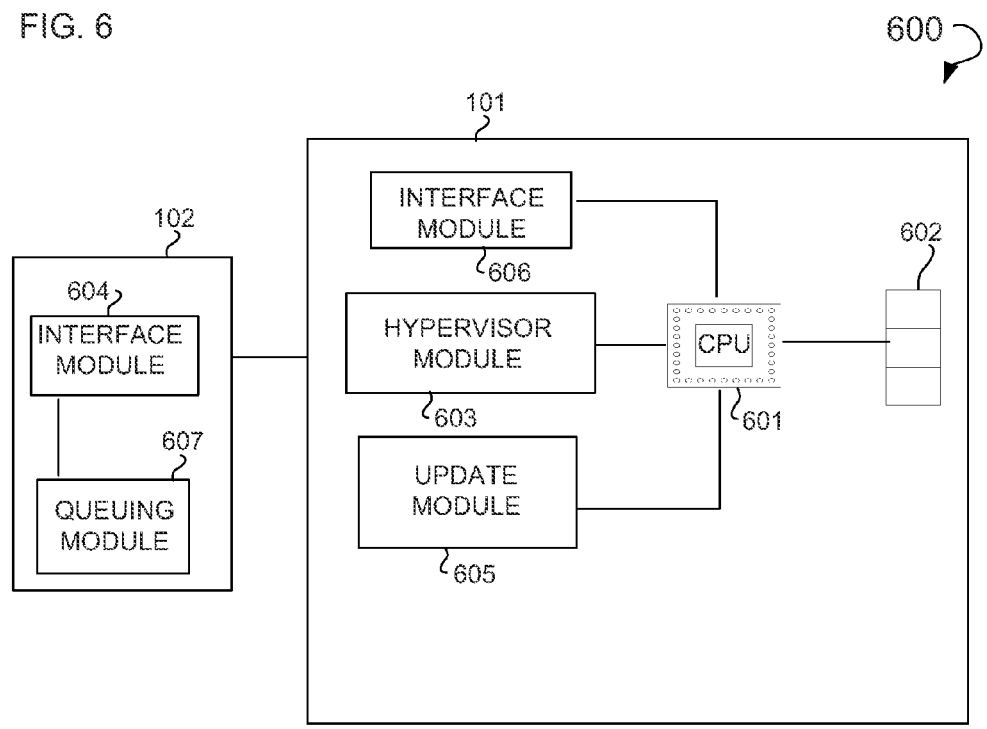
FIG. 6 is a block diagram of a system, according to an example embodiment, used to resolve a simultaneous access of a remote memory page by a hypervisor and an I/O device that is programmed by a VM.

FIG. 6 is a block diagram of an example system 600 used to resolve a simultaneous access of a remote memory page by a hypervisor and an I/O device that is programmed by a VM. An example of the system 600 is the blade rack 103 that includes the compute blade 101 and memory blade 102. These various blocks may be implemented in hardware, firmware, or software. Shown is a CPU 601 operatively connected to a memory 602. Operatively connected to the CPU 601 is a hypervisor module 603 to identify a memory page, associated with a memory blade, that is accessible via a common physical address, the common physical address simultaneously accessed by a hypervisor remapping the physical address to a machine address, and the physical address used as part of a DMA operation issued by an I/O device that is programmed by a VM. An interface module 604 initiates a transfer of data associated with the memory page, the data transferred to an additional memory page, associated with a host device (e.g., the compute blade 101), and that is identified by an additional machine address. Operatively connected to the CPU 601 is an update module 605 to update a P2M translation table associated with the hypervisor, and an IOMMU translation table associated with the I/O device, to reflect the remapping from the physical address to the additional machine address. Operatively coupled to the CPU 601 is an interface module 606 to issue a prepare command to the memory blade, the prepare command to cause the DMA operation for the memory page to be queued. Operatively coupled to the interface module 604 is a queuing module 607 to de-queue the DMA operation and applying the DMA operation to the data transferred to the additional memory page. In some example embodiments, the interface module 606 issues a transfer and update command to initiate the transfer of the data, and the update of the data using at least one DMA operation. In some example embodiments, the interface module 606 issues a complete command to the memory blade indicating to the memory blade that the memory blade should exit a prepare mode. In some example embodiments, the remapping occurs where an event takes place during the issuing of the DMA operation. In some example embodiments, the event includes at least one of a page fault event, a scheduling event, or a device interrupt event.

FIG. 7 is a flow chart illustrating an example method 700 executed to resolve a simultaneous access of a local memory page by a hypervisor and a I/O device that is programmed by a VM. This operation may be executed by the compute blade 101 in combination with the memory blade 102. Operation 701 is executed by the hypervisor module 503 to identify a memory page that is accessible via a common physical address, the common physical address simultaneously accessed by a hypervisor remapping the physical address to a machine address, and the physical address used as part of a DMA operation generated by an I/O device that is programmed by a VM. Operation 702 is executed by the interface 504 to transmit data associated with the memory page as part of a memory disaggregation regime, the memory disaggregation regime to include an allocation of an additional memory page, on a remote memory device, to which the data will be written. Operation 703 is executed by the update module 505 to update a P2M translation table associated with the hypervisor, and an IOMMU translation table associated with the I/O device, to reflect a mapping from the physical address to a machine address associated with the remote memory device and used to identify the additional memory page. An operation 704 is executed by the interface module 504 to issue a prepare command to the remote memory device, the prepare command to cause the DMA operation for the additional memory page to be queued. In some example embodiments, the remote memory device includes at least one of a memory blade or SSD. Operation 705 is executed by the interface module 504 to issue a transfer and update command to initiate the transmission of data to the additional memory page, the transfer and update command to cause the remote memory device to transmit the data and to apply the queued DMA operation to the data. Operation 706 is executed by the VM module 506 to issue commands to the I/O device that relate to the DMA operation, the commands issued directly to the I/O device by the VM without mediation by the hypervisor. Operation 707 is executed by the hypervisor module 503 to evict the memory page where an event takes place during the generation of the DMA operation.

FIG. 8 is a flow chart illustrating an example method 800 used to resolve a page fault that arises where a VM attempts to directly access an I/O device and the memory page is located remotely from the compute blade. This method 900 may be executed by the compute blade 101 in combination with the memory blade 102. An operation 801 is executed by the hypervisor module 603 to identify a memory page, associated with a memory blade, that is accessible via a common physical address, the common physical address simultaneously accessed by a hypervisor remapping the physical address to a machine address, and the physical address used as part of a DMA operation issued by an I/O device that is programmed by a VM. Operation 802 is executed by the interface 604 to initiate a transfer of data associated with the memory page, the data transferred to an additional memory page, associated with a host device, and that is identified by an additional machine address. Operation 803 is executed by the update module 605 to update a P2M translation table associated with the hypervisor, and an IOMMU translation table associated with the I/O device, to reflect the remapping from the physical address to the additional machine address. Operation 804 is executed by the interface module 606 to issue a prepare command to the memory blade, the prepare command to cause the DMA operation for the memory page to be queued. Operation 805 is executed by the queuing module 607 to de-queue the DMA operation and applying the DMA operation to the data transferred to the additional memory page. Operation 806 is executed by the interface module 606 to issue a transfer and update command to initiate the transfer of the data, and the update of the data using at least one DMA operation. Operation 807 is executed by the interface module 606 to issue a complete command to the memory blade indicating to the memory blade that the memory blade should exit a prepare mode. In some example embodiments, the remapping occurs where an event takes place during the issuing of the DMA operation. In some example embodiments, the event includes at least one of a page fault event, a scheduling event, or a device interrupt event.

FIG. 9 is a dual-stream flow chart illustrating an example method 900 that uses specific memory blade commands implemented as part of a memory disaggregation regime, where a page fault occurs during the direct access of an I/O device by a VM. Shown are operations 901-902, 904-905, and 908 that are executed by the compute blade 101. Also shown are operations 903, 906-907 that are executed by the memory blade 102. Operation 901 is executed to identify a victim memory page that is to be evicted and transferred to the memory blade 102. The transfer of this memory page will allow for memory to be freed up on the compute blade 101. Operation 902 is executed to issue, or otherwise transmit, a "prepare" command to the memory blade 102. The prepare command indicates the address (e.g., MA) on the compute blade 101 that holds data ("contents") of the memory page that are to be written to the memory blade 102 from the compute blade 101. This "prepare" command may be transmitted as part of the memory blade commands 214. Operation 903 is executed to receive the "prepare" command and to allocate memory on the memory blade 102 that will receive the transferred data of the evicted memory page. Further, upon receiving the "prepare" command I/O device operations 303 associated with the evicted memory page are stored into the I/O device operations queue 304 until the transfer of the memory page is complete. Operation 904 is executed to update the P2M translation table 207 and the IOMMU table 206 with the new PA→MA mappings (see exploded views 209-210). Operation 905 is executed to issue or transmit a "transfer and update command" to initiate a data transfer from the host device (e.g., the compute blade 101) to the memory blade 102 and the memory allocated thereon. This transfer is referenced at 215. Operation 906 is executed receive the "transfer and update command" and the beginning of the transferred data. Operation 907 is executed to signal the completion of the data transfer. As part of the execution of this operation 907, I/O device operations 303 are de-queued and satisfied. Operation 908 is executed to await notification from the memory blade 102 that the transfer is complete.

Figure 10:
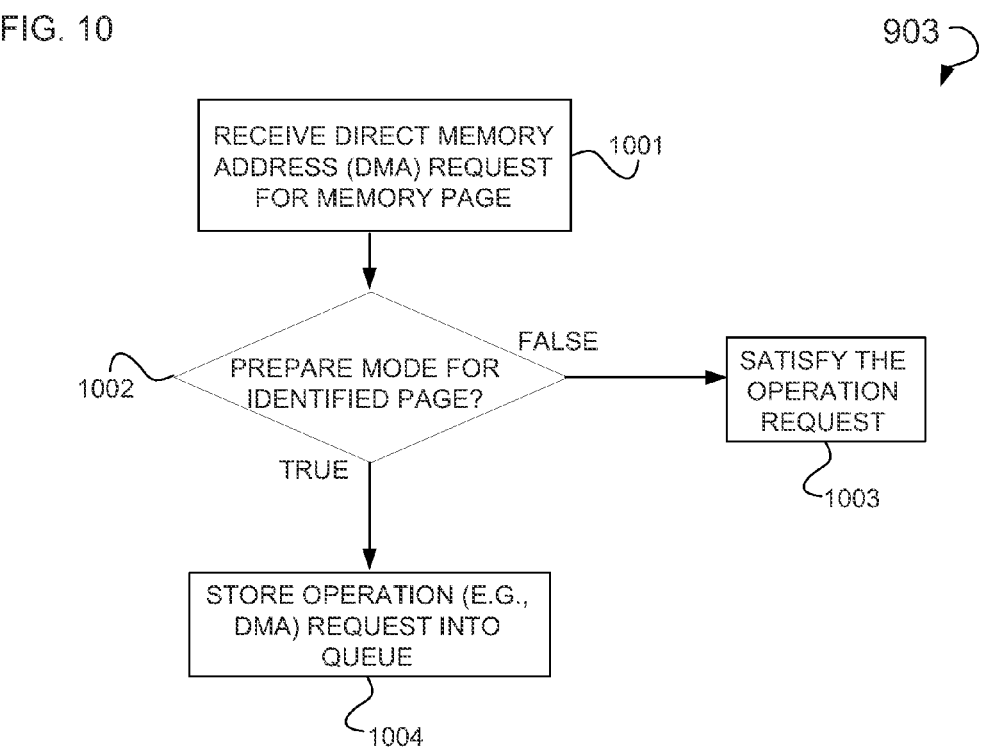
FIG. 10 is a flow chart illustrating an execution of an operation, according to an example embodiment, used to queue I/O device operations.

FIG. 10 is a flow chart illustrating an example execution of the operation 903 used to queue I/O device operations. Shown is an operation 1001 that is executed to receive an I/O device operation 303 in the form of a DMA request relating to a memory page. A decision operation 1002 is shown that determines whether the memory blade 102 has received a "prepare" command for the identified memory page. In cases where decision operation 1002 evaluates to "false" an operation 1003 is executed. In cases where decision operation 1002 evaluates to "true," an operation 1004 is executed. Operation 1003 is executed to satisfy the I/O device operation 303 request. Operation 1004 is executed to store the I/O device operation 303 into the I/O device operation queue 304.

Figure 11:
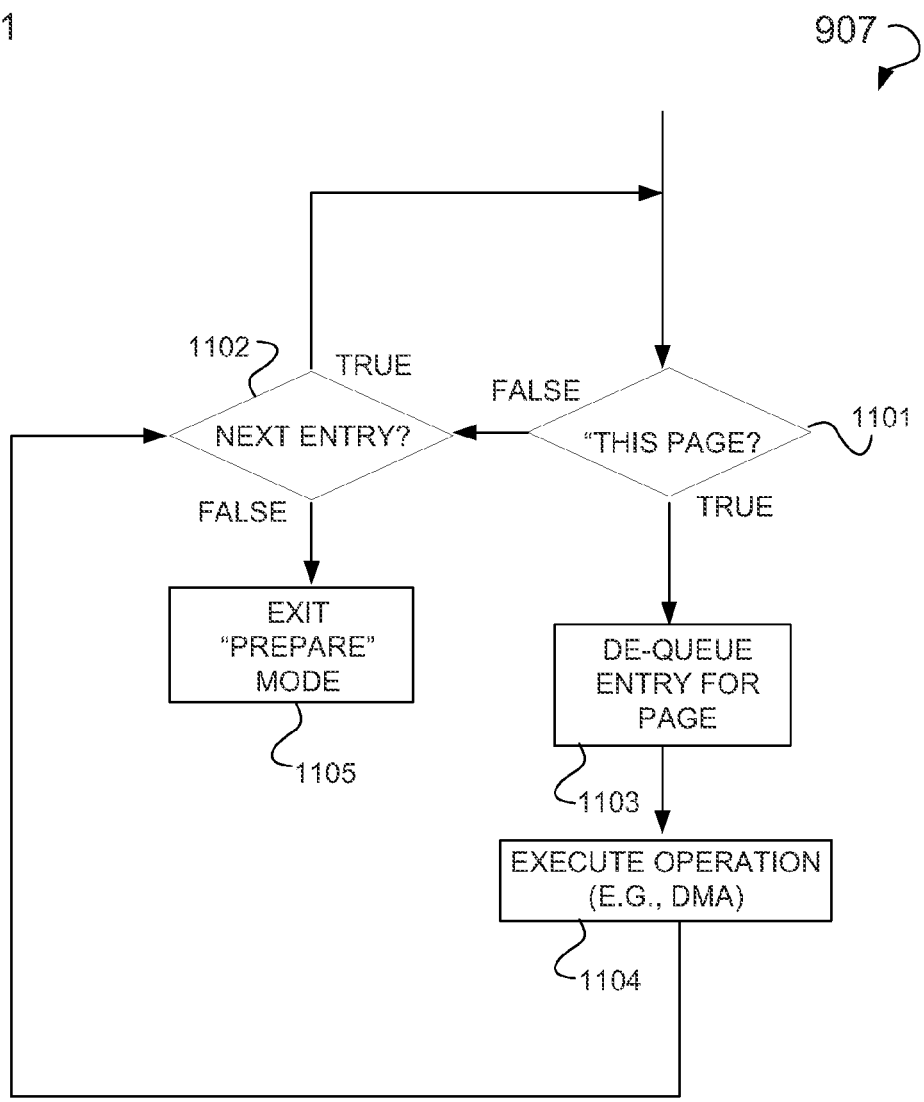
FIG. 11 is a flow chart illustrating an execution of an operation, according to an example embodiment, that de-queues the I/O device operations and signals the completion of the data transfer.

FIG. 11 is a flow chart illustrating an example execution of an operation 907 that de-queues I/O device operations and signals the completion of the data transfer. Shown is a decision operation 1101 that determines whether it is this page (i.e., the memory page that is being transferred to the memory blade 102) that is being transferred. In cases the decision operation evaluates to "true," an operation 1103 is executed. In cases where the decision operation 1101 evaluates to "false," a further decision operation 1102 is executed. Operation 1103 is executed to de-queue the queue entry (i.e., the I/O device operation 303) for this memory page. Operation 1104 is executed to execute the I/O device operation 303. Decision operation 1102 is executed to determine whether there is an additional entry in the I/O device operations queue 304. In cases where the decision operation 1102 evaluates to "true," the decision operation 1101 is re-executed. In cases where the decision operation 1102 evaluates to "false," an operation 1105 is executed and the "prepare" mode is exited for the evicted memory page by the memory blade 102.

Figure 12:
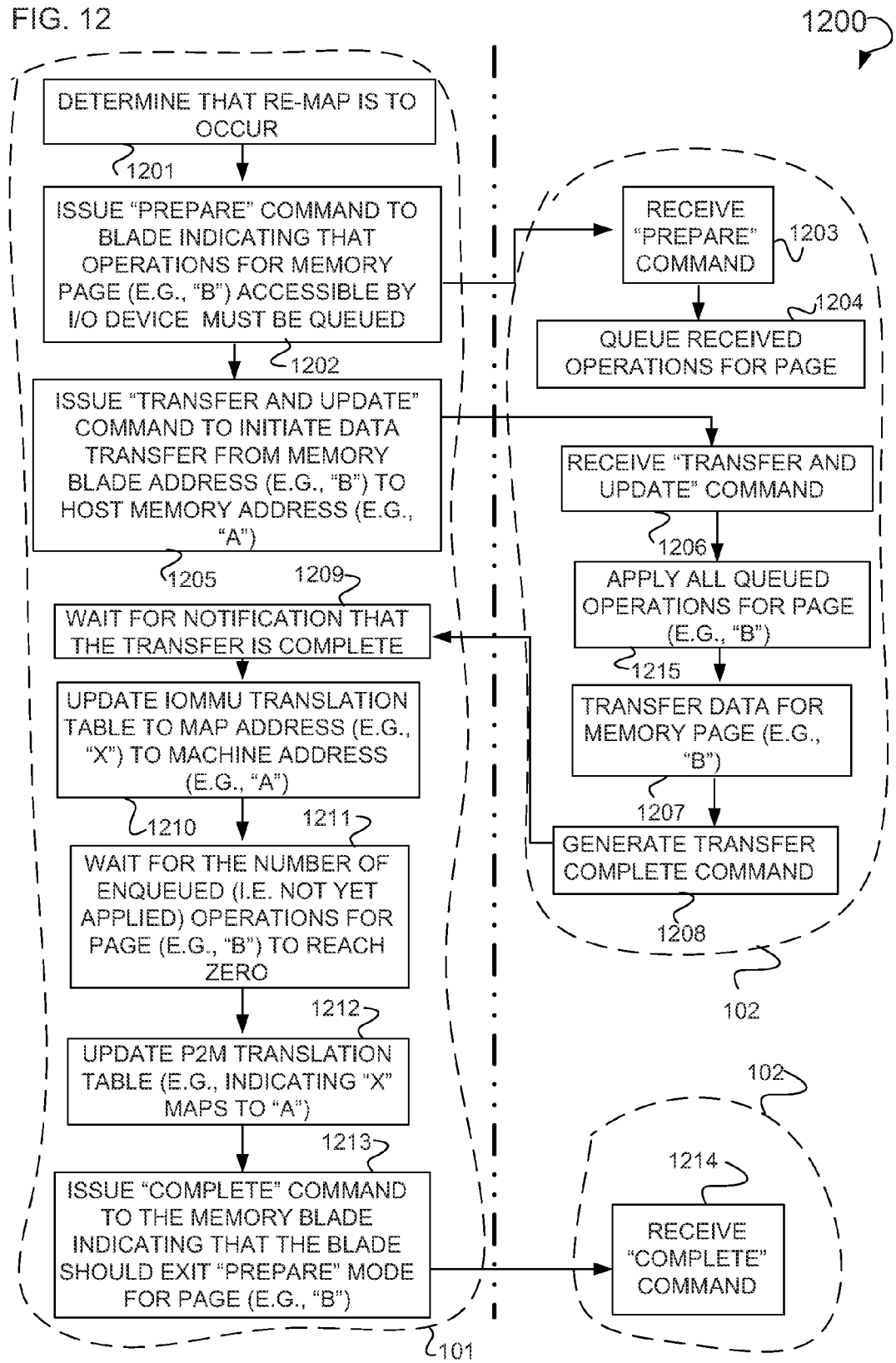
FIG. 12 is a dual-stream flow chart illustrating a method, according to an example embodiment, that uses specific memory blade commands implemented as part of a memory disaggregation regime, where a page fault occurs during the direct access of an I/O device by a VM.

FIG. 12 is a dual-stream flow chart illustrating an example method 1200 that uses specific memory blade commands implemented as part of a memory disaggregation regime, where a page fault occurs during the direct access of an I/O device by a VM. Shown are operations 1201-1202, 1205, 1209-1213 that are executed by the compute blade 101. Also shown are operations 1203-1204, 1206-1208, and 1215 that are executed by the memory blade 102. Operation 1201 is executed to determine whether a remapping of PA to MA within the P2M translation table 207 or IOMMU table 207 is to occur. This determination may be based upon page fault occurring and an exception being trapped by the hypervisor 202. Further, this determination may be based upon the VM seeking to prefetch a memory page from the memory blade 102 that may be used by the VM at a future time. Operation 1202 is executed to issue or transmit a "prepare" command by the compute blade 101 to instruct the memory blade 102 to queue I/O device commands relating to the data that is to be written to the memory blade 102 from the compute blade 101. This "prepare" command may be included as part of the memory blade commands 401. Operation 1203 is executed to receive the "prepare" command. Operation 1204 is executed to queue the I/O device commands 303 that are received subsequent to the receiving of the "prepare" command. Operation 1205 is executed to issue a "transfer and update command" to initiate data transfer from the memory blade address to the host address (i.e., the compute blade 101 as MA associated therewith). Operation 1206 is executed to receive the "transfer and update" command. Operation 1215 is executed to apply all queued I/O device operations to the memory page that is to be transferred to the compute blade 101. Operation 1207 is executed to transfer the data for the memory page from the memory blade 102 to the compute blade 101. This transfer is illustrated at 403. Operation 1208 is executed to generate a complete transfer command denoting that the transfer of data from the memory blade 102 to the compute blade 101 is complete. Operation 1209 is executed to wait for notification that the transfer of data is complete. Operation 1210 is executed to update the IOMMU table 206 with the new PA→MA mapping (see e.g., exploded view 404). Operation 1211 is executed to wait for the completed execution of I/O device commands within the I/O device operations queue 304 to reach zero such that the queued I/O device operations are applied to the memory page that is transferred to the compute blade 102. Operation 1212 is executed to update the P2M translation table 207 with the new PA→MA mapping (see e.g., exploded view 407). Operation 1213 is executed to issue or transmit a "complete" command to the memory blade 102 indicating that the memory blade 102 should exit the "prepare" mode. Operation 1214 is executed to receive the "complete" command as part of the memory blade commands 401.

Figure 13:
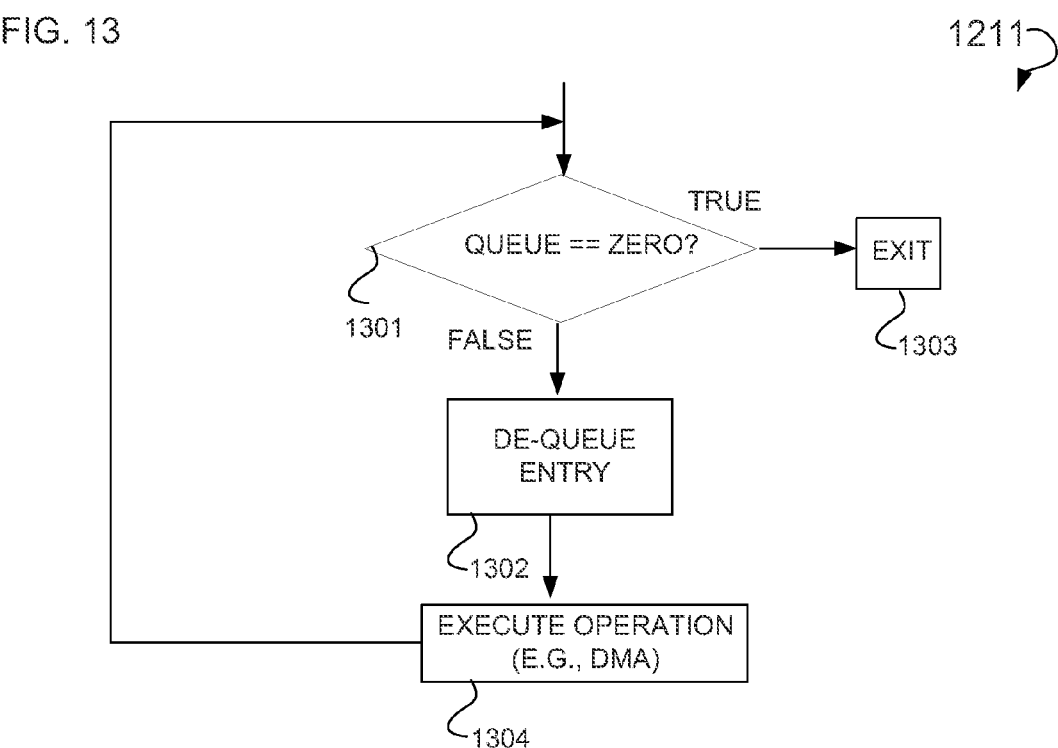
FIG. 13 is a flow chart illustrating the execution of an operation, according to an example embodiment, that applies the queued I/O device operations to the memory page transferred to the compute blade.

FIG. 13 is a flow chart illustrating the example execution of an operation 1211 that applies the queued I/O device operations to the memory page transferred to the compute blade. Operation 1311 is executed to ensure that I/O device operations received after the receiving of the "transfer and update" command are applied to the memory page. These I/O device operations are applied even in cases where the transfer of the memory page to the compute blade 101 has been completed. Decision operation 1301 is executed to determine whether the queue is empty (i.e., equal to "0"). In cases where decision operation 1301 evaluates to "true," operation 1303 is executed. In cases where decision operation 1301 evaluates to "false," an operation 1302 is executed. Operation 1303 is executed to exit from the operation 1311. Operation 1302 is executed to de-queue an entry in the queue for the memory page. Operation 1304 is executed to execute a I/O device operation associated with the memory page.

FIG. 14 is a diagram of an example computer system 1400. Shown is a CPU 1401. The processor die 201 may be a CPU 1401. In some example embodiments, a plurality of CPU may be implemented on the computer system 1400 in the form of a plurality of core (e.g., a multi-core computer system), or in some other suitable configuration. Some example CPUs include the x86 series CPU. Operatively connected to the CPU 1401 is Static Random Access Memory (SRAM) 1402. Operatively connected includes a physical or logical connection such as, for example, a point to point connection, an optical connection, a bus connection or some other suitable connection. A North Bridge 1404 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1405 is shown that is operatively connected to the North Bridge 1404. A Digital Visual Interface (DVI) port 1407 is shown that is operatively connected to the North Bridge 1404. Additionally, an analog Video Graphics Array (VGA) port 1406 is shown that is operatively connected to the North Bridge 1404. Connecting the North Bridge 1404 and the South Bridge 1411 is a point to point link 1409. In some example embodiments, the point to point link 1409 is replaced with one of the above referenced physical or logical connections. A South Bridge 1411, also known as an I/O Controller Hub (ICH) or a Platform Controller Hub (PCH), is also illustrated. A PCIe port 1403 is shown that provides a computer expansion port for connection to graphics cards and associated GPUs. Operatively connected to the South Bridge 1411 are a High Definition (HD) audio port 1408, boot RAM port 1412, PCI port 1410, Universal Serial Bus (USB) port 1413, a port for a Serial Advanced Technology Attachment (SATA) 1414, and a port for a Low Pin Count (LPC) bus 1415. Operatively connected to the South Bridge 1411 is a Super Input/Output (I/O) controller 1416 to provide an interface for low-bandwidth devices (e.g., keyboard, mouse, serial ports, parallel ports, disk controllers). Operatively connected to the Super I/O controller 1416 is a parallel port 1417, and a serial port 1418.

The SATA port 1414 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1402 and/or within the CPU 1401 during execution thereof by the computer system 1400. The instructions may further be transmitted or received over the 10/100/1000 ethernet port 1405, USB port 1413 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

The methods illustrated herein may be written as data and instructions (of the software) stored in respective storage devices, which are implemented as one or more computer-readable or computer-usable storage media or mediums. The storage media include different forms of memory including semiconductor memory devices such as Dynamic Random Access Memory (DRAM), or Static Random Access Memory (SRAM), Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method comprising:
   identifying a memory page that is accessible via a common physical address, the common physical address simultaneously accessed by a hypervisor remapping the physical address to a machine address and directly by an Input/Output (I/O) device, and the physical address used as part of a Direct Memory Address (DMA) operation generated by the I/O device that is programmed by a Virtual Machine (VM), wherein the concurrent accessing grant the hypervisor access to the common physical address while buffering access from the I/O device;
   transmitting data associated with the memory page as part of a memory disaggregation regime, the memory disaggregation regime to include an allocation of an additional memory page, on a remote memory device, to which the data will be written; and
   updating a physical address to machine address (P2M) translation table associated with the hypervisor, and an I/O Memory Management Unit (IOMMU) translation table associated with the I/O device, to reflect a mapping from the physical address to a machine address associated with the remote memory device and used to identify the additional memory page.

2. The computer implemented method of claim 1, further comprising issuing a prepare command to the remote memory device, the prepare command to cause the DMA operation for the additional memory page to be queued.

3. The computer implemented method of claim 2, wherein the remote memory device includes at least one of a memory blade or Solid State Drive (SSD).

4. The computer implemented method of claim 2, further comprising issuing a transfer and update command to initiate the transmission of data to the additional memory page, the transfer and update command to cause the remote memory device to transmit the data and to apply the queued DMA operation to the data.

5. The computer implemented method of claim 1, further comprising issuing commands to the I/O device that relate to the DMA operation, the commands issued directly to the I/O device by the VM without mediation by the hypervisor.

6. The computer implemented method of claim 1, further comprising evicting the memory page where an event takes place during the generation of the DMA operation.

7. A computer implemented method comprising:
   identifying a memory page, associated with a memory blade, that is accessible via a common physical address, the common physical address simultaneously accessed by a hypervisor remapping the physical address to a machine address and directly by an Input/Output (I/O) device, and the physical address used as part of a Direct Memory Address (DMA) operation issued by the I/O device that is programmed by a Virtual Machine (VM), wherein the concurrent accessing grant the hypervisor access to the common physical address while buffering access from the I/O device;
   initiating a transfer of data associated with the memory page, the data transferred to an additional memory page, associated with a host device, and that is identified by an additional machine address; and
   updating a physical address to machine address (P2M) translation table associated with the hypervisor, and an I/O Memory Management Unit (IOMMU) translation table associated with the I/O device, to reflect the remapping from the physical address to the additional machine address.

8. The computer implemented method of claim 7, further comprising issuing a prepare command to the memory blade, the prepare command to cause the DMA operation for the memory page to be queued.

9. The computer implemented method of claim 8, further comprising de-queuing the DMA operation and applying the DMA operation to the data transferred to the additional memory page.

10. The computer implemented method of claim 7, further comprising issuing a transfer and update command to initiate the transfer of the data, and the update of the data using at least one DMA operation.

11. The computer implemented method of claim 7, further comprising issuing a complete command to the memory blade indicating to the memory blade that the memory blade should exit a prepare mode.

12. The computer implemented method of claim 7, wherein the remapping occurs where an event takes place during the issuing of the DMA operation.

13. The computer implemented method of claim 12, wherein the event includes at least one of a page fault event, a scheduling event, or a device interrupt event.

14. A computer system comprising:
    a hypervisor module to identify a memory page that is accessible via a common physical address, the common physical address simultaneously accessed by a hypervisor to remap the physical address to a machine address and directly by an Input/Output (I/O) device, and the physical address used as part of a Direct Memory Address (DMA) operation generated by the I/O device that is programmed by a Virtual Machine (VM)), wherein the concurrent accessing grant the hypervisor access to the common physical address while buffering access from the I/O device;
    an interface to transmit data associated with the memory page as part of a memory disaggregation regime, the memory disaggregation regime to include an allocation of an additional memory page, on a remote memory device, to which the data will be written; and
    an update module to update a physical address to machine address (P2M) translation table associated with the hypervisor, and an I/O Memory Management Unit (IOMMU) translation table associated with the I/O device, to reflect a mapping from the physical address to a machine address associated with the remote memory device and used to identify the additional memory page.

15. The computer system of claim 14, wherein the interface issues a prepare command to the remote memory device, the prepare command to cause the DMA operation for the additional memory page to be queued.

16. The computer system of claim 15, wherein the remote memory device includes at least one of a memory blade or Solid State Drive (SSD).

17. The computer system of claim 15, wherein the interface issues a transfer and update command to initiate the transmission of data to the additional memory page, the transfer and update command to cause the remote memory device to transmit the data and to apply the queued DMA operation to the data.

18. The computer system of claim 14, wherein the interface issues commands to the I/O device that relate to the DMA operation, the commands issued directly to the I/O device by the VM without mediation by the hypervisor.

19. The computer system of claim 14, wherein the hypervisor evicts the memory page where an event takes place during the generation of the DMA operation.

20. The computer system of claim 14, wherein the hypervisor uses a Peripheral Component Interconnect Express (PCIe) transport medium to transmit instructions to the remote memory device.

* * * * *